United States Patent [19]

Chadwick

[11] Patent Number: 4,577,087

[45] Date of Patent: Mar. 18, 1986

[54] APPARATUS FOR LASER WELDING PIPES AND THE LIKE

[75] Inventor: John R. Chadwick, Wilmslow, England

[73] Assignee: Fairey Engineering Limited, Stockport, England

[21] Appl. No.: 625,887

[22] Filed: Jun. 29, 1984

[30] Foreign Application Priority Data

Jun. 29, 1983 [GB] United Kingdom ................. 8317666

[51] Int. Cl.[4] .............................................. B23K 26/00
[52] U.S. Cl. ......................... 219/121 LC; 219/121 LQ
[58] Field of Search ................. 219/121 LC, 121 LD, 219/121 LG, 121 LN, 121 LP, 121 LQ, 121 LR, 121 LV, 121 LU, 121 LY; 350/486

[56] References Cited

U.S. PATENT DOCUMENTS

| | | | |
|---|---|---|---|
| 4,048,464 | 9/1977 | Gale et al. ................. | 219/121 FS X |
| 4,080,525 | 3/1978 | Gobetz ....................... | 219/121 LQ X |
| 4,088,865 | 5/1978 | Peters et al. .............. | 219/121 LT X |
| 4,367,017 | 1/1983 | Jimbou et al. .............. | 350/486 |
| 4,429,211 | 1/1984 | Carstens et al. ......... | 219/121 LQ X |

*Primary Examiner*—C. L. Albritton
*Attorney, Agent, or Firm*—Millen & White

[57] ABSTRACT

Laser welding apparatus includes a first mirror whose angle may be adjusted but which is fixed in position and on which a laser beam is incident. The first mirror reflects the laser beam onto a second mirror which may be rotated through at least 180° about the axis of the articles to be welded and which reflects the laser beam onto a third mirror whose angle may be adjusted and which may be rotated through at least 360° about the axis of the articles to be welded. The laser beam then passes to a focussing mirror which focusses the beam through a welding nozzle onto the surfaces to be welded. In use, the third mirror is continuously rotated about the entire periphery of the articles to be welded and the positions and/or angles of all the mirrors are adjusted to ensure that the laser beam is transmitted along the desired pathway.

16 Claims, 3 Drawing Figures

APPARATUS FOR LASER WELDING PIPES AND THE LIKE

The present invention relates to apparatus for laser welding pipes and other structures of circular cross-section and is particularly concerned with welding pipe sections or the like, as are commonly used in oil and gas pipe lines, in situations where it is not possible to manipulate the pipe sections, that is to say move them relative to the laser The invention relates in particular to apparatus for directing a laser beam for welding pipes or the like.

The sections of such pipe lines are generally made of steel whose structure and/or physical properties tend to be altered locally by the substantial heat produced when gas or arc welding a pipe section to a further such section or to a further component, such as a flange. The thickness of the pipe sections is generally such that more than one layer of weld material is required to complete the join using conventional welding processes thus producing a large zone of weld metal in the finished pipeline. By contrast, however, the use of a laser for such welding produces a narrow, deep penetration weld and the pipe sections may be joined in a single pass. Thus not only is the volume of weld metal at the joint reduced and the heat affected zone much smaller than with conventional welding processes, but also the time taken to weld each joint is substantially reduced.

When laying a pipeline on land or at sea, pipe sections are successively welded together and progressively lowered into a trench or into the sea. Adjacent sections must of course be welded over their entire periphery but the sections of pipe can of course not be rotated since one of them is generally already connected to the pipeline under construction. It is therefore necessary to rotate the welding head around the pipe sections to be welded and whilst this presents little or no problem when gas or arc welding, it does present a problem when laser welding since a high power laser is both large and delicate and also has trailing power lines and it is therefore not desirable to rotate it around a large pipe section.

Accordingly it is desirable when laser welding pipes to retain the laser stationary in a protected location and to provide an optical system arranged progressively to rotate the laser beam around the pipes whilst focussed on the abutting edges to be welded. The design of such an optical system is complicated by the fact that it must be capable of directing the laser beam to all locations on the pipes including that opposite to that of the laser, that is to say displaced around the pipes by 180°, and in this position the optical system must deflect the beam around the pipes and reverse its direction by 180°.

It is known that a laser or other light beam may be deflected in one plane by a device including a spaced pair of parallel mirrors whose planes are transverse to the incident beam by placing one mirror in the beam and rotating the other mirror. If such devices were to be used in the optical system of a laser welding apparatus for pipes it will be appreciated that at least three of them would be required, that is to say six mirrors. A proportion of the power is lost each time a laser beam is reflected and thus such a system would be associated with a substantial power loss.

British Patent No. 1500964 discloses an apparatus for laser welding pipe sections in which a mirror is rotated through at least part of a revolution about the pipe axis to direct the laser onto the surfaces to be welded. Most of the constructions disclosed utilise a laser whose beam is directed on the pipe axis and when welding long pipe sections this means that the laser must of necessity be a considerable distance from the surface to be welded. In one construction the laser is situated externally of the pipe line with its beam directed perpendicular to the pipe axis and four movable mirrors are provided on respective tracks arranged in a rectangular configuration about the pipes to be welded. The laser beam is directed onto the first mirror which is then moved along its track whilst its angle is constantly altered to direct the beam progressively at about one quarter of the periphery of the pipes to be welded. When the mirror reaches the end of its track its angle is suddenly altered to direct the beam to the second mirror which in turn directs it to the pipes to be welded and is progressively moved along its track. The process is continued until the four mirrors between them have directed the beam over the entire periphery of the pipes to be welded. This construction not only requires four independently linearly and angularly movable mirrors but also produces a weld with four discontinuities, i.e. at the points at which the beam was suddenly deflected away from the pipes when a mirror reached the end of its track and directed the beam to the next mirror.

Accordingly it is an object of the present invention to provide an apparatus for directing a laser beam for laser welding pipes and the like in which the laser beam is not required to pass through or along the pipe axis and the laser remains stationary as the laser beam is rotated around the pipes by means of an optical system, the optical system using less optical elements than most systems for this purpose.

According to the present invention apparatus for directing a laser beam for laser welding pipes or like articles of circular section comprises a first mirror which is fixed in position remote from the axis of the articles to be welded and on which in use, a laser beam is incident, a second mirror, a third mirror, focussing means arranged, in use, to direct the beam onto the surfaces to be welded substantially perpendicular to the axis of the articles, first drive means arranged to rotate the second mirror about the articles to be welded, second drive means arranged to rotate the third mirror through at least 360° about the articles to be welded and control means arranged to adjust the relative angular orientations of the mirrors such that, in use, the beam produced by the laser is reflected from the first mirror to the second mirror and thence to the third mirror and is substantially focussed by the focussing means onto the surfaces to be welded, whereby the focussed laser beam may be moved continuously around the periphery of the articles being welded.

Thus the optical system in the apparatus in accordance with the present invention may include only three mirrors which are always so positioned and orientated with respect to one another that the laser beam is directed onto the surface or surfaces to be welded. The laser may remain stationary and when the laser beam impinges on the first mirror it is preferably directed transverse to the axis, or is provided with a beam guide to direct it transverse to the axis, of the pipes or the like to be welded and this fact coupled with the fact that the first mirror is not situated on the axis means that the laser may be situated close to the surfaces to be welded. The fact that the third mirror may be rotated through at least 360° about the axis of the articles to be welded means that the entire joint may be welded in a single continuous operation without producing any welding discontinuities.

It is preferred that angular orientations of the first and third mirrors are adjustable in two e.g. perpendicular planes and the angular orientation of the second mirror is adjustable in not more than one plane but all three mirrors may be adjustable in two planes.

It is preferred that the control means is coupled to the first and second drive means and ensures that the angular displacement of the second mirror from the first mirror is exactly one half the angular displacement of the third mirror from the first mirror. It is also preferred that the second mirror lies in the plane which passes through the mid-point of the line connecting the first and third mirrors and extends perpendicular to the said line. Thus in this construction the second mirror is always midway between the first and third mirrors as regards angular displacement when viewed in the axial direction and there is therefore no need to adjust the angle of the second mirror in the plane parallel to the axis of the articles to be welded. It is also preferred that the second mirror is so disposed that when all three mirrors lie in the same plane the second mirror is symmetrically positioned with respect to the first and third mirror but offset from the line connecting them. Thus in this construction the second mirror is always midway between the first and third mirrors in the axial direction and there is therefore no need to adjust the angle of the second mirror in the plane perpendicular to the axis of the articles to be welded. In the most preferred construction in which both the preferred features referred to above are provided the second mirror will always of necessity be correctly positionally and angularly located with respect to the first and third mirrors and thus the second mirror may be angularly fixed with respect to the means carrying it, i.e. the second mirror may rotate about the articles to be welded as a solid body and is nevertheless always correctly orientated.

The focussing means may be constituted by one of the first, second and third mirrors, in particular the third mirror, but it is preferred that the focussing means comprises a separate focussing mirror onto which the beam incident, in use, on the third mirror is reflected and which then focusses this beam onto or adjacent the surfaces to be welded.

The preferred construction includes a support member adapted to be positioned adjacent e.g. around the articles to be welded, the first mirror being connected to the support member, the second and third mirrors being carried by respective carriages mounted to move on respective circular tracks on the support member. The support member preferably comprises a two-part annular enclosure containing the first, second and third mirrors, the focussing means and the two circular tracks. Such an enclosure may thus be opened and then secured in position around the articles to be welded and will protect the optical components of the apparatus.

The annular enclosure preferably includes a welding nozzle which extends out of the enclosure, is connected to move with the third mirror and is positioned so that, in use, the focussed laser beam passes out through it and impinges on the surfaces to be welded. Gas nozzles for inert gas may be provided on or adjacent to the welding nozzle to provide a locally inert environment around the area being welded.

A preferred construction also includes a position error sensor associated with the welding nozzle arranged to produce an error signal, if, in use, the laser beam is incorrectly positioned with respect to the nozzle and to move one or more of the mirrors in dependence on the magnitude of the error signal.

Further features and details of the present invention will be apparent from the following description of two specific embodiments which are given by way of example with reference to the accompanying diagrammatic drawings, in which.

Figure 1:
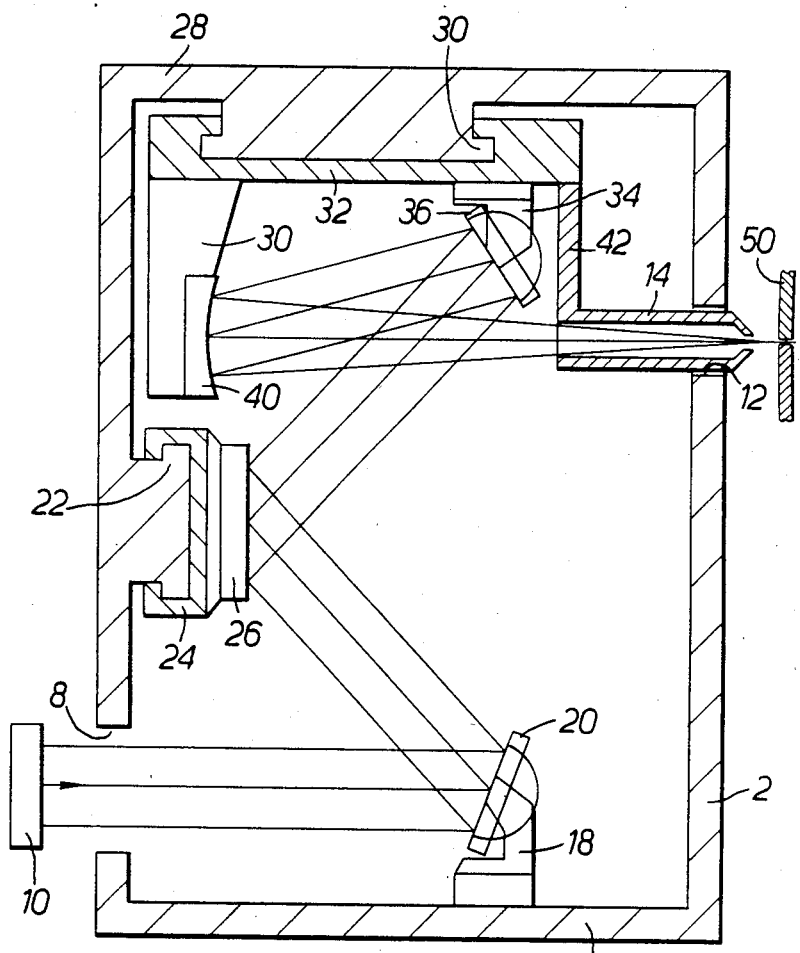
FIG. 1 is a simplified longitudinal section through one half of a welding apparatus in accordance with the invention.
Figure 2:
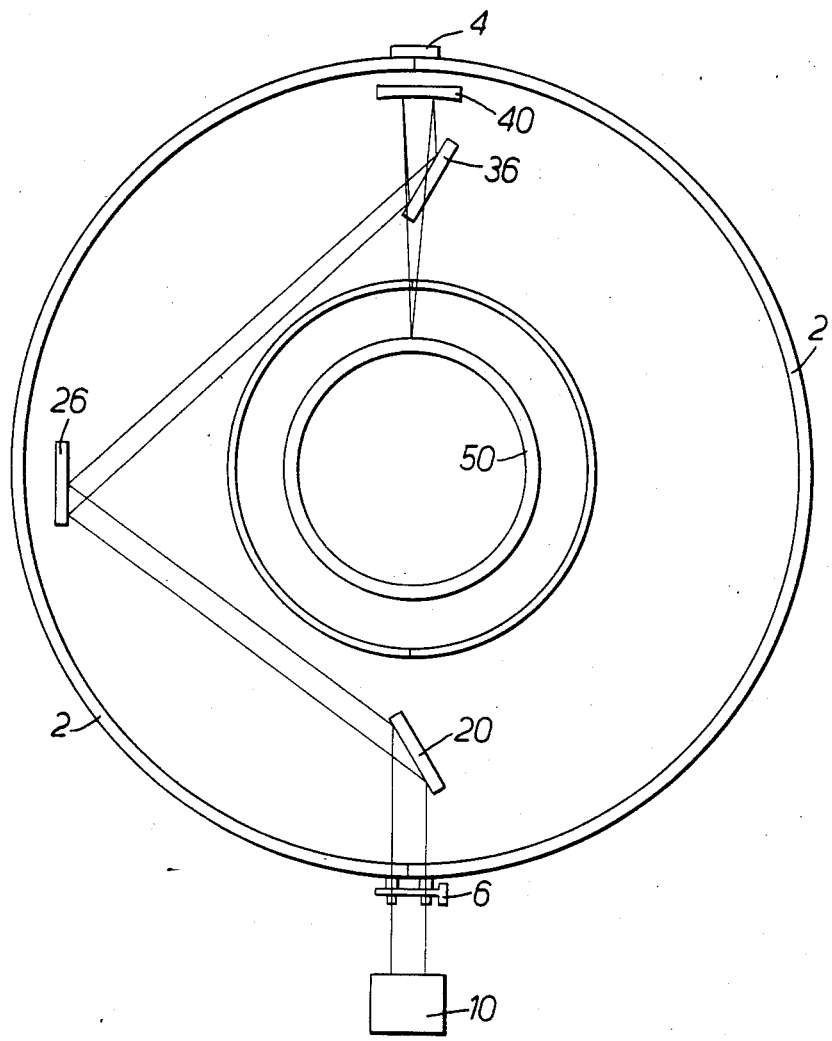
FIG. 2 is a still further simplified transverse section through the apparatus.

Referring first to FIGS. 1 and 2, the apparatus includes an annular enclosure comprising two halves 2 which are connected together by a hinge 4 along one longitudinal edge and which may be clamped together by a fastener 6 along the other edge. The enclosure has an aperture 8 in its outer wall adjacent which is a stationary laser 10 and through which a laser beam is conducted from the laser by a conventional optical system (not shown). The enclosure also has an annular aperture 12 in its inner wall through which a gas shroud nozzle 14 extends, as will be explained in more detail below.

Fixed to one end wall 16 of the enclosure is a two axis servo controlled gimbal mounting 18 to which a first mirror 20 is connected in such a position that the laser beam entering through the aperture 8 impinges on it. Connected to the outer wall of the enclosure is a circular track 22 which extends around the enclosure and on which a carriage 24 is carried. The carriage 24 carries a second mirror 26 fixed with respect to it and is connected to a first motor (not shown) to be moved along the track 22 around the enclosure. Connected to the other end wall 28 of the enclosure is a further circular track 30 which extends around the enclosure and on which a carriage 32 is carried. The carriage 32 carries a further two axis servo controlled gimbal mounting 34 to which a third mirror 36 is connected. An arm 38 connected to the carriage 32 carries a focussing mirror 40 whilst a further such arm 42 carries the gas shroud nozzle 14 which is of hollow tubular form and extends out of the enclosure through the aperture 12. The carriage 32 is connected to a second motor (not shown) to be moved along the track 30 together with the mirrors 36 and 40 and the gas shroud nozzle 14 around the enclosure. The aperture 12 is provided with a brush seal (not shown) through which the nozzle 14 extends and may be moved when the carriage 32 moves.

The two servo motors for the carriages 24 and 32 are provided with linear or geared rotary transducers to produce feedback signals and are connected to a central controller (not shown) which controls both motors to ensure that the angular displacement of the second mirror 26 from the first mirror 20 when viewed in the axial direction as in FIG. 2, is always exactly half that of the third mirror 36 from the first mirror 20. The two gimbal mountings 18 and 34 are also connected to the central controller and are moved by the latter after calculating the positional algorithms of all the mirrors such that the laser beam is always reflected from the first mirror to the second mirror then to the third mirror and then to the focussing mirror.

It will be appreciated that the third mirror is positionally, though not angularly, fixed with respect to the focussing mirror and that the focussing mirror is aligned with the nozzle 14. Thus, if the laser beam impinges on the third mirror it will be reflected through the nozzle to focus at a point adjacent the end of the nozzle whose precise position is determined by the focal length of the focussing mirror. It will be appreciated also that the second mirror is always half way between the first and third mirrors as regards angular position, i.e. it is positioned to bisect the angle between the first and third mirrors, and that when all three mirrors are in the same plane the second mirror is symmetrically disposed with respect to the first and third mirrors, i.e. it is half way between them in the axial direction but offset with respect to them in a direction transverse to the axial direction. As a consequence, it is only necessary to adjust the angles of the first and third mirrors and the second mirror, which is automatically always orientated with its reflecting surface parallel to the tangent at its instantaneous position on the track, is automatically always correctly orientated.

In use, the two halves of the enclosure are opened and placed around two pipes 50 which are in butt engagement and to be welded together and the two halves are then clamped together. The enclosure is then centred with respect to the pipes with the gas shroud nozzle directed at the junction of the two pipes. The apparatus is so dimensioned with respect to the pipes that the focal point of the focussing lens lies substantially at the surfaces of the pipes to be welded and the apparatus is retained in position with respect to the pipes by any appropriate means with the result that as the third mirror is rotated the focal point rotates around the surface of the two mating edges to be welded together. It will be appreciated that due to the presence of the pipes it is not possible to direct the laser beam around the "back" of the pipes, that is to say if the third mirror rotates substantially through the point where it is offset from the fixed mirror by 180° the beam will impinge on the inner wall of the enclosure, the precise position at which this happens being determined primarily by the relative radial positions of the three mirrors. Welding is thus commonly begun with the third mirror offset from the fixed mirror and the initial entry direction of the laser beam by 180° or slightly more. The third mirror is then rotated clockwise as seen in FIG. 2 on its track with the mirror 40 and gas nozzle moving with it whilst the central controller ensures that the second mirror moves at precisely one half the rate of the third mirror. The mirrors then move through the O° displacement position in which they all lie in the same plane and the movement continues in the same sense until the third mirror is again 180° or more from the first mirror at which point the second mirror is 90° away from the first mirror but displaced by 180° from the position shown in FIG. 2. At every position of the mirrors the central controller ensures that the mirrors are at the correct angle and the laser beam is directed to and focussed on the surfaces to be welded. When welding is complete the enclosure is removed from the pipes and may be used to weld a fresh pipe to the welded pipeline.

Whilst welding proceeds, inert gas such as
14. argon is introduced into the enclosure which flows out through the gas shroud nozzle and thus ensures that the actual welding occurs in a locally substantially inert atmosphere and that metallic vapour is flushed away from the welding zone.

Figure 3:
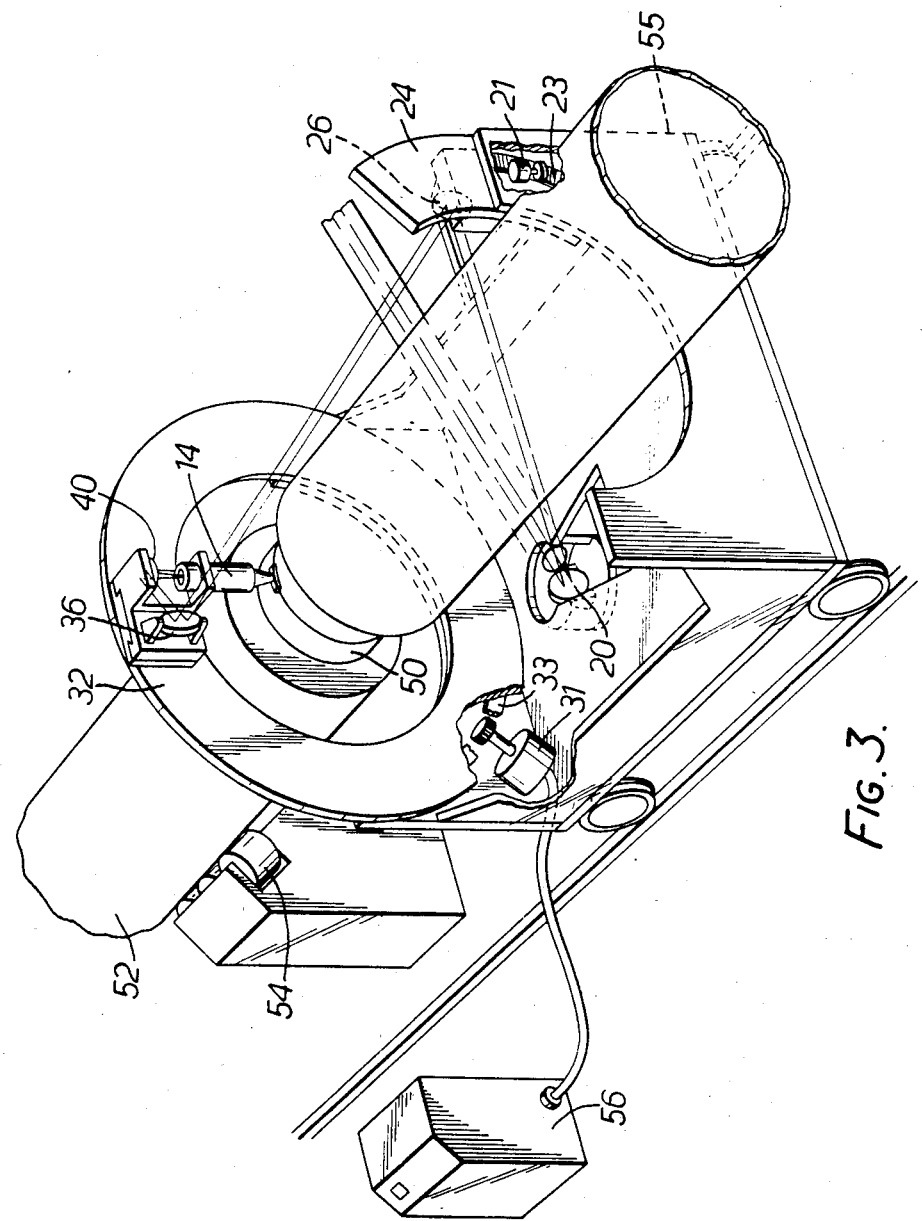
FIG. 3 is a diagrammatic perspective view of a modified construction of welding apparatus in accordance with the present invention.

In the modified embodiment illustrated in FIG. 3, the pipes 50 are shown encased in concrete cladding 52 and supported by rollers 54. The support for the mirrors comprises a wheeled trolley 55. The first mirror 20 is carried by the trolley and positioned so that it is impinged on by a laser beam which extends transverse but not perpendicular to the axis of the pipes. The orientation of the first and second mirrors is adjustable about two axes. The second mirror is connected to a carriage 24 which may be rotated about the pipes by a worm drive motor 21 cooperating with a rack 23. The third mirror 36 is adjustable about two axes and is carried by an annular carriage 32 which may be rotated about the pipes by a worm drive motor 31 cooperating with a rack 33. The orientation adjustment motors of the mirrors 20, 26 and 36 and the motors 21 and 31 are connected to and controlled by a central controller comprising a computer 56.

The mirror 26 is not positioned between the mirrors 20 and 36 in the axial direction and in this embodiment it is further from the mirror 36 than is the mirror 20 thereby facilitating assembly of the apparatus and access to the movable mirrors. The angular displacement of the mirror 26 from the fixed mirror 20 need not be exactly half that of the mirror 36, though in practice its displacement is generally approximately half that of the mirror 36.

In use, a laser beam is transmitted onto the mirror 20 whose orientation is adjusted to direct the beam to the mirror 26 which directs it to the mirror 36 which in turn directs it to the surfaces to be welded, as in the first embodiment. As the carriage 32 and thus also the mirrors 36 and 40 and the nozzle 14 are rotated, the computer 56 adjusts the orientations of the mirrors 20, 26 and 36 to ensure that the laser beam follows the desired path. Whilst the coarse control of the positions of the mirrors is effected by the computer in dependence on the position of the nozzle 14, a fine control is effected in response to feedback signals indicative of the beam position from each mirror which are used to adjust the position of the preceding mirror. Gas nozzles (not shown) discharge inert gas adjacent the nozzle 14 and provide a locally inert environment around the area being welded. In other respects construction and operation of the second embodiment are substantially similar to those of the first embodiment.

It will be appreciated that a great many modifications may be made to the constructions described above. In particular, it may be difficult in practice to set the servo controlled mirrors at precisely the required angles using only the positional algorithms of the second and third mirrors and it is therefore preferred that a position error sensor be connected to the gas shroud nozzle and arranged to compare the actual position of the laser beam within the nozzle with the desired position of the beam and to produce a position error signal. This error signal can then be fed either directly or indirectly to the first and/or third mirrors to adjust their position to ensure that the laser beam is truly centrally disposed within the gas shroud nozzle.

If the pipes to be welded have a truly circular external shape the focal point of the focussing lens will always be at the correct positon with respect to the pipes once it has been initially set up. However, pipes sometimes exhibit a certain degree of eccentricity and to compensate for this a proximity sensor may be associated with the free end of the gas shroud nozzle to produce a signal indicative of the instanteous distance between the surface to be welded and the free end of the gas shroud nozzle. This signal may then be used to move the focussing mirror 40 to ensure that the laser beam is in fact focussed at the correct spot and it will be appreciated that such movement will necessitate a minor angular adjustment of the third mirror 36 also.

Naturally, the gas shroud nozzle may be associated with a wire feed apparatus for multiple pass welding or gap filling and the enclosure may contain more than one gas shroud nozzle and associated optical system for multipass welding.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. Apparatus for directing a laser beam for laser welding pipes or like articles of circular section, said articles having an axis, said apparatus comprising a first mirror which is disposed in a position remote from said axis of said articles to be welded and on which, in use, a laser beam transmitted transverse to said axis is incident, a second mirror, a third mirror, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continously around the periphery of said articles being welded.

2. Apparatus as claimed in claim 1, wherein the angular orientations of said first, second and third mirrors are adjustable in two planes.

3. Apparatus as claimed in claim 1, wherein said control means is coupled to said first and second drive means and ensures that the angular displacement of said second mirror from said first mirror is exactly one half the angular displacement of said third mirror from said first mirror.

4. Apparatus as claimed in any one of claims 1 to 3, wherein said second mirror is so disposed such that when all three said mirrors lie in the same plane said second mirror is symmetrically positioned with respect to said first and third mirrors but offset from the line connecting them.

5. Apparatus as claimed in any one of claims 1 to 3, wherein said focussing means comprises a concave mirror connected to move with said third mirror.

6. Apparatus as claimed in any one of claims 1 to 3, including a support member adapted to be positioned around said articles to be welded, said first mirror being connected to said support member, and respective carriages carrying said second and third mirrors and being mounted to move on respective circular tracks on said support member.

7. Apparatus as claimed in claim 6, wherein said support member comprises a two-part annular enclosure containing said first, second and third mirrors, said focussing means and said two circular tracks.

8. Apparatus as claimed in claim 7, including a welding nozzle which extends out of said enclosure, is connected to move with said focussing means and is positioned so that, in use, said focussed laser beam passes out through it and impinges on said articles to be welded.

9. Aparatus for directing a laser beam for laser welding pipes or like articles of circular section, said articles having an axis, said apparatus comprising: a first mirror which is adjustable in two planes and which is disposed in a position remote from said axis of the articles to be welded and on which, in use, a laser beam is incident, a second mirror which is adustable in two planes, a third mirror, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

10. Apparatus for directing a laser beam for laser welding pipes or like articles of circular section, said articles having an axis, said apparatus comprising a first mirror which is fixed in position remote from said axis of the articles to be welded and on which, in use, a laser beam is incident, a second mirror, a third mirror, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means coupled to said first and second drive means, said control means including means for ensuring that the angular displacement of said second mirror from said first mirror is exactly one-half the angular displacement of said third mirror from said first mirror such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

11. Apparatus for directing a laser beam for laser welding pipes or like articles of circular section, said articles having an axis, said apparatus comprising: a first mirror which is fixed in position remote from said axis of the articles to be welded and on which, in use, a laser beam is incident, a second mirror and a third mirror, said second mirror being disposed such that when all three of said mirrors lie in the same plane said second mirror is symmetrically positioned with respect to said first and third mirrors but offset from the line connecting them; focussing means arranged, in use, to direct said beam onto said articles to be welded substantially perpendicular to said axis of the articles, first drive means arranged to rotate said second mirror about said third mirror through at least 360° about said articles to be welded and control means arranged to adjust the relative angular orientations of said mirror such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

12. Apparatus for directing a laser beam for laser welding pipes or like articles of circular section, said articles having an axis, said apparatus comprising a first mirror which is fixed in position remote from said axis of the articles to be welded and on which, in use, a laser beam is incident, a second mirror, a third mirror, focussing means including a concave mirror connected to the third mirror for movement therewith arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

13. Apparatus for directing a laser beam for laser welding pipes or like articles of circular section, said articles having an axis, said apparatus comprising: a first mirror which is fixed in position remote from said axis of the articles to be welded and on which, in use, a laser beam is incident, a second mirror, a third mirror, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded the apparatus further comprising: a support member configured as a two-part annular enclosure adapted to be positioned around said articles to be welded, said first mirror being welded inside of the enclosure, the enclosure including circular tracks for positioning around an article to be welded, upon which circular tracks carriages are mounted with the first and second mirrors being mounted on said carriages for movement around said article, said focussing means being positioned within said enclosure.

14. Apparatus for directing a laser beam for laser welding pipes or like articles of circular section, said articles having an axis, said apparatus comprising a first mirror which is fixed in position remote from said axis of the articles to be welded and on which, in use, a laser beam is incident from a direction transverse to said axis of the articles being welded, a second mirror, a third mirror, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

15. Apparatus for directing a laser beam for laser welding pipes or like articles of circular section, said articles having an axis, said apparatus comprising a first mirror which is adjustable in two planes and disposed in a position remote from said axis of the articles to be welded and on which, in use, a laser beam is incident, a second mirror which is adjustable in one plane, a third mirror which is adjustable in two planes, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

16. Apparatus for directing a laser beam for laser welding pipes or like articles of circular section, said articles having an axis, said apparatus comprising a first mirror which is adjustable in two planes and disposed in a position remote from said axis of the articles to be welded and on which, in use, a laser beam is incident, a second mirror which is fixed, a third mirror which is adjustable in two planes, focussing means arranged, in use, to direct said beam onto said articles to be welded substantially perpendicular to said axis of the articles, first drive means arranged to rotate said second mirror about said articles to be welded, second drive means arranged to rotate said third mirror through at least 360° about said articles to be welded and control means arranged to adjust the relative angular orientations of said mirrors such that, in use, the beam produced by said laser is reflected from said first mirror to said second mirror and thence to said third mirror and is substantially focussed by said focussing means onto said articles to be welded, whereby the focussed laser beam may be moved continuously around the periphery of said articles being welded.

* * * * *